Dec. 18, 1962 J. P. GRAM 3,069,046
DRINKING CUP CONSTRUCTION
Filed March 10, 1961
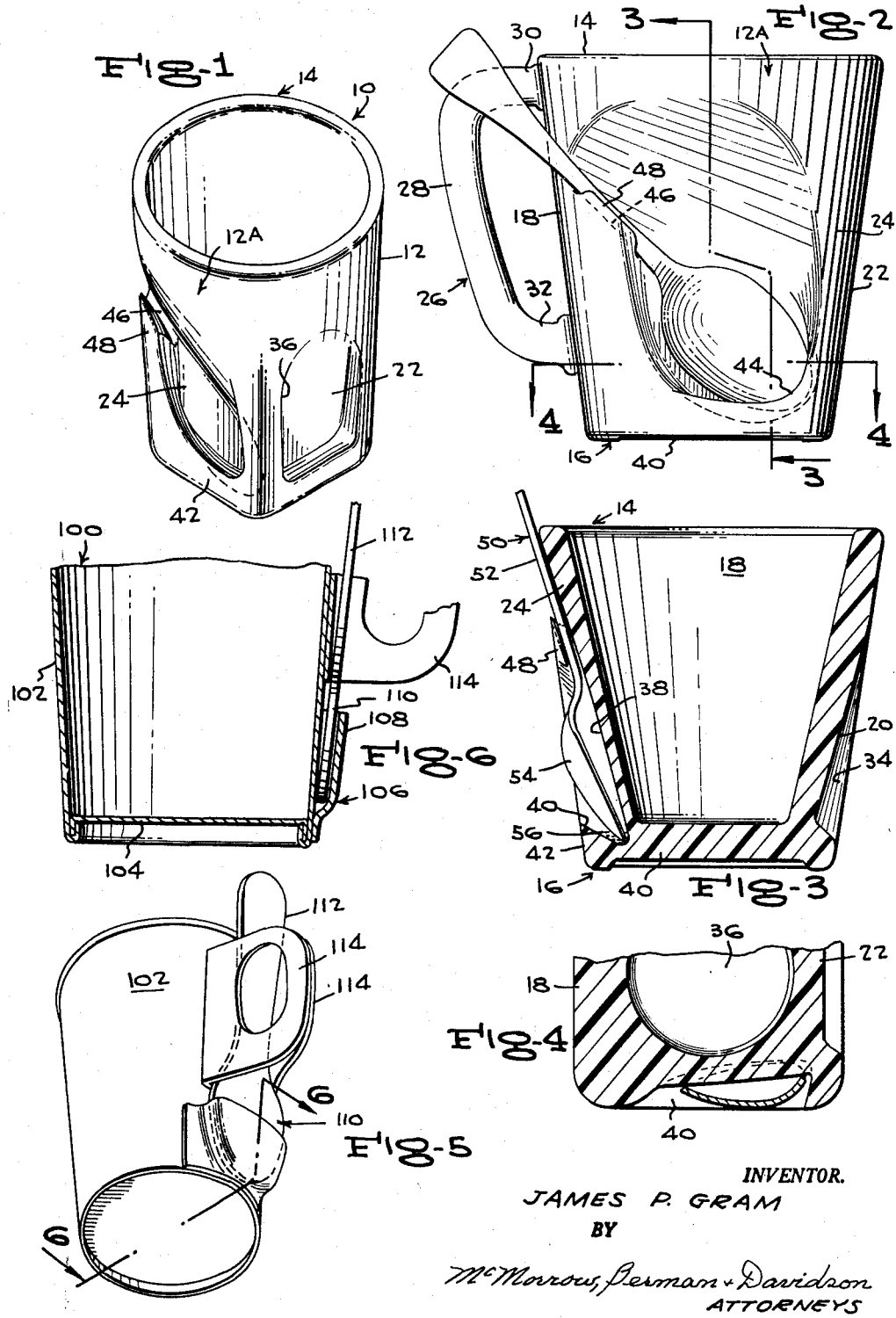
INVENTOR.
JAMES P. GRAM
BY
McMorrow, Berman & Davidson
ATTORNEYS

United States Patent Office 3,069,046
Patented Dec. 18, 1962

3,069,046
DRINKING CUP CONSTRUCTION
James P. Gram, 42 Forkes Road E., Welland Junction,
Ontario, Canada
Filed Mar. 10, 1961, Ser. No. 94,770
3 Claims. (Cl. 220—85)

This invention relates to the general field of containers and/or receptacles and, more specifically, the instant invention pertains to the provision of a container or a receptacle having means incorporated therewith for retaining a utensil thereon as, for example, tableware.

It has long been observed that diners, restaurants, "drive-ins," quick-lunch counters, and other similar establishments which are engaged in what is generally known as "quick-service" food dispensing businesses frequently find it almost impossible to maintain a counter, table, or other similar type of support clean and sanitary throughout the course of the operating day. For example, in the "drive-in" type of restaurant or diner, certain high peaks or rush period hours are encountered at which time the waitress or waiter, as the case may be, is hard put to maintain the counter or table in a sanitary condition. Spilled food, both of the solid and liquid type, is frequently encountered as one customer succeeds another and despite the waitress' efforts with a dishcloth or other cleansing article, the table or counter still remains in unsanitary condition. In such establishments, it is customary that a customer when ordering a beverage, especially a beverage such as tea or coffee, be served the same in relatively heavy china of an inexpensive type and without the sophistication which leads to the provision of a saucer upon which a spoon is generally placed. Accompanying the container or receptacle is, in most instances, a spoon utilized by the customer in the stirring of sugar, milk, lemon, and other ingredients he may wish to add to the beverage, as desired. The spoon or other agitating means is normally placed upon the unsanitary counter or table both before and after stirring which, lends very heavily to the customer incurring illnesses as a result of the contamination between the unsanitary counter, table, or other support and the agitating means.

It is, therefore, one of the primary object of this invention to provide a container or receptacle for beverages to be consumed on the premises of establishments of the type referred to above, wherein the container or receptacle is provided with means for holding the utensil, agitator, or similar device in juxtaposition relative thereto whereby contact with an unsanitary support device is obviated, both before and after stirring.

Another object of this invention is to provide a container or receptacle for beverages or other foods with means for releasably securing to the receptacle or container a manually manipulated spoon, fork, or other type of tableware used as an adjunct to the consumption of a beverage or other foods which may be disposed within the container or receptacle.

A further object of this invention is to provide, a combination with a container or receptacle, means as an integral part thereof for holding in juxtaposition, a digital operable utensil in close proximity thereto whereby the container or receptacle may be served to a customer simultaneously with the utensil and whereby contamination of the utensil through contact with the support upon which the container is placed is eliminated.

A still further object of this invention is to provide a food or beverage container or receptacle, the container or receptacle being especially designed, when used in conjunction with beverages, to eliminate the necessity for providing a saucer in conjunction therewith to hold and retain those portions of the beverage which adhere to the spoon or other agitating device which is normally employed in combination therewith.

This invention contemplates, as a still further object thereof, the provision of a beverage container or receptacle together with means for holding a spoon in juxtaposition relative to a side thereof, and including a well or recess being so constructed and designed as to prevent the liquid accumulated therein from spilling therefrom when the container or receptacle is used for drinking purposes.

Still another object and advantage of the instant invention is to provide in a container or receptacle designed for drinking purposes, means for securing a spoon or other agitator to a side thereof whereby the provision of a separate saucer is rendered unnecessary, and whereby the number of dishes or other articles normally washed in a given restaurant. dinner, or similar establishment is materially reduced and to provide, at the same time, a device which is convenient to store and to handle during the course of its normal usage.

Again, it is still another object of this invention to provide a beverage container or cup with means for securing thereto a table utensil such as, for example, a spoon, the means being of such a type as to permit the same to be washed easily within the conventional dishwasher whereby the container or receptacle may be maintained in a highly sanitary condition and wherein the means are of such a type that the spoon or other table utensil may be placed in the holder in such a manner as not to interfere with the use of the cup as a vessel from which beverages may be consumed.

A still further object of this invention is to provide a container or receptacle of the type referred to supra, the design of the container or receptacle permitting the individual containers or receptacles to be stacked relative to each other whereby considerable storage space is preserved.

As still another object of this invention, it is contemplated to provide a container or receptacle for beverage, and in particular, wherein means are provided for holding a spoon, agitator, or other similar device in close proximity thereto, the container and agitating means being so designed as to permit the same to be disposable.

This invention also has, as a still further object thereof, the provision of a container, receptacle, cup or glass with means for holding in close juxtaposition relative thereto, a spoon, agitator, or other similar device, the container and/or agitating means being non-complex in construction and assembly, durable in use, and inexpensive to manufacture and maintain.

Other and further objects and advantages of the invention will become more evident from a consideration of the following specification, when read in conjunction with the annexed drawings, in which:

FIGURE 1 is a perspective view of a container or receptacle constructed in accordance with this invention and illustrating the means employed for holding a table utensil, or other device, in juxtaposition relative thereto;

FIGURE 2 is a side elevational view of the container or receptacle and of the utensil retaining means;

FIGURE 3 is a detail cross sectional view. FIGURE 3 being taken substantially on the line 3—3 of FIGURE 2, looking in the direction of the arrows;

FIGURE 4 is a detail cross sectional view, FIGURE 4 being taken substantially on the horizontal plane of line 4—4 of FIGURE 2, looking in the direction of the arrows;

FIGURE 5 is a perspective view of a second embodiment of this invention, FIGURE 5 illustrating a container or receptacle together with means for holding a table utensil or agitating device in juxtaposition relative thereto; and FIGURE 6 is an enlarged detail cross sectional view, FIGURE 6 being taken substantially on a vertical plane of line 6—6 of FIGURE 5, looking in the direction of the arrows.

Referring now more specifically to FIGURES 1 to 4, inclusive, of the drawing, reference numeral 10 designates, in general, a container or receptacle constructed in accordance with the teachings of this invention.

The container or receptacle 10 may be formed of metal, plastic, paper or any other desirable material that is impervious to liquid penetration. The container or receptacle 10, according to the embodiment illustrated in FIGURES 1 to 4, inclusive, includes a normally upright hollow main body portion and comprises a continuous side wall 12 which tapers downwardly from its upper rim or end 14 to its lower base or end 16. The upper end portion 12A of the side wall 12 is substantially cylindrical in configuration and merges, at the lower end thereof with a plurality of panels 18, 20, 22 and 24 which have a substantially rectangular configuration. The interior surface of the container or receptacle 10 is substantially frusto-conical in shape.

The container or receptacle 10 is formed integrally with a C-shaped handle 26 having a bight 28 from the ends of which project the arms 30, 32, the latter being connected with the upper end portion 12A and the panel 18.

For design or artistic purposes, the side panels 20, 22 are recessed as at 34, respectively, and the panel 24 is recessed at 38 and is further modified in a manner explained infra. The container receptacle 10, at the lower ends of the panels 18, 20, 22 and 24 is closed by an integrally formed bottom wall 40.

The side panel 24, at the lower corner of the recess 38 adjacent the junction thereof with the panel 22 is provided with a groove 40 which also extends downwardly into the flange 42, formed in the process of making the recess 38. The groove 40 extends from the corner formed at the juncture of the side walls 22, 24 in a direction towards the handle 26 and has a substantially arcuate configuration. This gives rise to a retaining flange 44, the function of which will be described below.

The side wall 24 is also formed with a groove 46, the outer side of which is defined and limited by a flange 48. As is seen in FIGURES 1 and 2 of the drawings, the flange 48 and the groove 46 are both downwardly inclined in the direction toward the groove 40.

The recess 38 is of greater width than the recess 34 diametrically opposed thereto whereby a utensil or agitating device generally indicated at 50 may be accommodated.

Referring again to FIGURES 2 and 3 of the drawings, it will be seen that the utensil 50 comprises a spoon having an elongated substantially rectangular shank 52 from the lower end of which projects the bowl portion 54 thereof. The utensil 50 is so designed that the shank 52 is adapted to be releasably secured within the groove 46, with the tip end portion of the bowl 54 resting within the groove 40. In this position, the flanges 42 and 48 serve as means for preventing the lateral displacement of the utensil or spoon 50 from within the grooves 40 and 46 whereby the container or receptacle 10 together with the utensil 50 may be presented simultaneously to a customer, the container or receptacle 10 being filled, of course, with a consumable food or beverage (not illustrated).

The groove 40 which receives the lower end of the bowl 54 is of such length and such depth as to permit an accumulation of liquid particles therein which may drop from the bowl 54 after the utensil 50 has been used to stir a beverage, for example.

The size and shape of the groove 40, which may be actually considered as being a well, is of such length and depth that when the user of the container 10 finishes stirring the beverage disposed therein and replaces the spoon in the manner illustrated in FIGURES 2 and 3 of the drawings, the liquid 56 which has accumulated within the well or groove 40 will not be displaced therefrom while the user of the container 10 tips the same in a normal drinking operation or movement.

It should be manifest from the foregoing description that the combination of the container or receptacle 10 with the utensil 50 not only tends to promote sanitary serving of beverages and foods since the utensil 50 is never placed in contact with a counter or table, but at the same time, the combination reduces the necessity for the provision of saucers, napkins, and other articles normally employed in the serving of a beverage. It should be also clear that the combination above described achieves all of the other objectives outlined supra.

FIGURES 5 and 6 disclose a second embodiment of this invention wherein the container or receptacle is generally indicated at 100 and is formed of a disposable paper composition. The container or receptacle 100 includes a continuous side wall 102 having an inverted frusto-conical configuration, and the lower end thereof is closed by means of an end wall 104.

Adjacent the end wall 104, and on the exterior side of the side wall 102 is fixedly secured an elongated substantially rectangular keeper 106 having an essentially outwardly spaced bight portion 108. As is seen in FIGURES 5 and 6, the bight portion opens at its upper end in order to receive the lower end of an agitator or spoon 110 having a shank portion 112. The shank portion 112 of the agitator 110 is embraced between a pair of flexible handle members 114 which are secured to the side wall 102 in the usual and conventional manner.

In utilizing the second embodiment of this invention, it is only necessary for the user to move the handle members 114 away from the closed position shown in FIGURE 5 to free the shank 112 whereby the agitator 110 may be removed from within the bight 108 and employed in the stirring of the beverage contained within the container or receptacle 100. After agitating the beverage, the agitator 110 may be replaced within the bight portion 108 and the handles 114 returned to the position shown in FIGURE 5 whereby the user of the device may tilt the same in a customary manner in order to drink therefrom. The bight portion 108, in the second embodiment of the invention, serves as a well or recess in the same manner as the well or recess indicated at 40 in the preceding embodiment described above.

Having described and illustrated this invention in detail, it will be understood that the two embodiments offered herein merely comprise examples thereof, and that the scope of this invention is to be modified only by the pending claims.

What is claimed is:

1. A container or receptacle for a beverage or other foods, said container or receptacle including a continuous side wall, said side wall having a recess formed therein extending intermediate the ends thereof, said side wall having a groove formed therein adjacent the upper end thereof to form a flange laterally spaced from said side wall, and a well disposed adjacent the lower end thereof, said flange, side wall and groove being adapted to releasably receive therein the upper end of a table utensil, and said well being adapted to receive the lower end of said utensil.

2. A container or receptacle for a beverage or other consumable foods, said container comprising an elongated normally upright side wall having a cylindrical configuration adjacent the upper end thereof and a plurality of substantially rectangular panels adjacent the lower end thereof, handle means projecting from one of said panels, the other of said panels having inwardly extending recesses formed therein, one of said panels having a groove formed therein, said groove being inclined at an angle relative to the longitudinal axis of said container and disposed adjacent the upper end of said recess formed therein, said side wall having a well formed therein diagonally disposed with respect to said groove, said groove and well being adapted to releasably secure therein the shank and bowl of a spoon.

3. A substantially cylindrical container or receptacle for a beverage or food, said container having a continuous side wall normally disposed in upright position, a substantially rectangular strip of material fixedly secured to the bottom end of said container, said strip having a centrally located bight projecting laterally from said side wall, a pair of handle members fixedly secured to said side wall adjacent the upper end thereof, said handle members being flexible, and said bight portion being adapted to receive the bowl portion of a spoon or other agitating device and the shank portion of said spoon being adapted to be releasably embraced by said handle means.

References Cited in the file of this patent

UNITED STATES PATENTS

| | | |
|---|---|---|
| 1,240,072 | Maiden | Sept. 11, 1917 |
| 1,276,018 | Blaetus | Aug. 20, 1918 |
| 2,840,292 | Stoddard | June 24, 1958 |